Feb. 6, 1973 R. F. RAWLINGS ET AL Re. 27,577

SHELL STRINGER APPARATUS

Original Filed Sept. 1, 1966 4 Sheets-Sheet 1

INVENTORS
RICHARD F. RAWLINGS
GEORGE E. AUSTIN

BY

ATTORNEYS

SHELL STRINGER APPARATUS
Original Filed Sept. 1, 1966 4 Sheets-Sheet 2
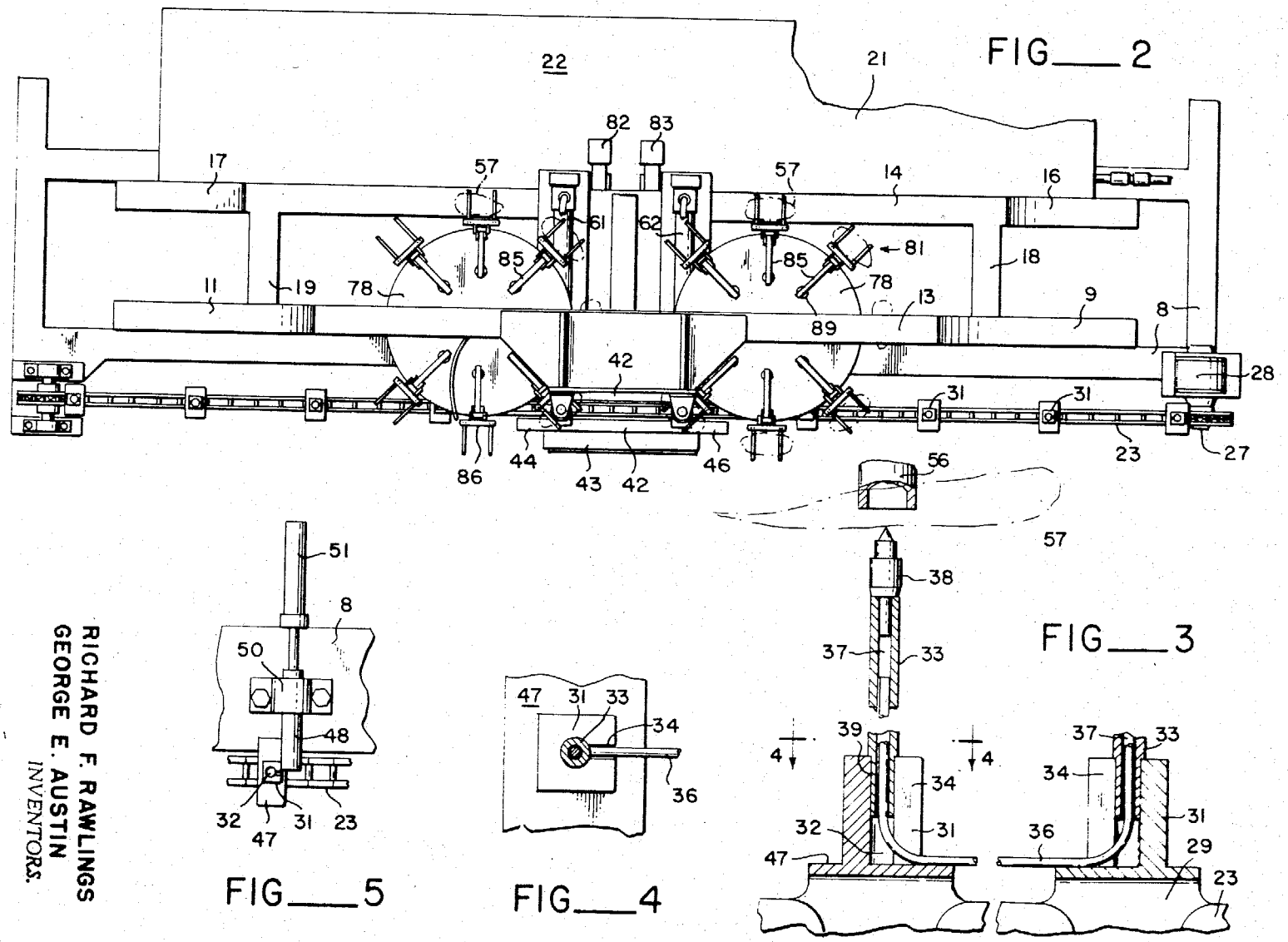
RICHARD F. RAWLINGS
GEORGE E. AUSTIN
INVENTORS.
BY
ATTORNEYS

RICHARD F. RAWLINGS
GEORGE E. AUSTIN
INVENTORS.

BY

ATTORNEYS

SHELL STRINGER APPARATUS

Original Filed Sept. 1, 1966

4 Sheets-Sheet 4

RICHARD F. RAWLINGS
GEORGE E. AUSTIN
INVENTORS.

BY

ATTORNEYS

United States Patent Office

Re. 27,577
Reissued Feb. 6, 1973

27,577
SHELL STRINGER APPARATUS

Richard F. Rawlings, 226 SW. 131st St., Seattle, Wash. 98146, and George E. Austin, Mercer Island, Wash.; said Austin assignor to said Rawlings Original No. 3,431,803, dated Mar. 11, 1969, Ser. No. 576,635, Sept. 1, 1966. Application for reissue Feb. 12, 1971, Ser. No. 115,144
Int. Cl. B26d *7/06, 5/20*
U.S. Cl. 83—95 6 Claims

Matter enclosed in heavy brackets [ ] appears in the original patent but forms no part of this reissue specification; matter printed in italics indicates the additions made by reissue.

ABSTRACT OF THE DISCLOSURE

A shell stringing device for punching a hole in individual shells and stringing the shells onto a wire which is rigidly supported during the punching operation. The individual shells are automatically conveyed to the punching position over the wire, punched and strung onto the wire.

The present invention relates to apparatus for punching and stringing shells onto wire stringers and more particularly to a device for punching and stringing oyster sheels onto U-shaped wires which are then used in oyster seeding beds.

In commercial oyster production large numbers of old shells must be placed in the water for "seeding," i.e. providing a shell surface on which new oysters will attach themselves and begin their growth. It is customary to string the old shells on a wire approximately six feet long with half of the shells directed in one direction and the other half in the opposite direction, the strung shells being then hung over a beam or log in the water and allowed to seed. The average number of sheels per string is approximately 70 and hundreds of thousands of these strings are used for seeding depending upon the size of the operation. Thus, it is necessary to punch and string great quantities of shells. In the past, both the punching and the placing of the shell on the wire has been done entirely by hand which is a slow, expensive and tedious process. Because of the crude equipment utilized it has also been a somewhat risky operation since the shells must be held under a punch by hand while the hole is being made. The present invention provides apparatus for accomplishing the punching and stringing of sheels in an extremely rapid manner with the processing time for one string of shells being in the neighborhood of 35 seconds. The apparatus may be fed by a single operator who merely places the shells to be strung on movable indexing tables and the punching and stringing is done automatically.

The primary object of the present invention is therefore, to provide a shell punching and stringing apparatus which will automatically cycle to receive, convey, position, punch and string shells without the necessity of manual handling.

Another object of the present invention is to provide a shell punching and stringing apparatus of the character described which will rapidly and economically produce strings of shells with a minimum amount of attention from the operator.

These and other objects and advantages of the invention will be apparent from the following specification and appended claims and from the accompanying drawings wherein:

FIG. 2 is a top plan view of the apparatus;

FIG. 3 is a partially sectioned elevational detail of the wire string holding means;

FIG. 4 is a cross sectional view taken along lines 4—4 of FIG. 3;

FIG. 5 is a plan view taken along lines 5—5 of FIG. 1;

Figure 1:
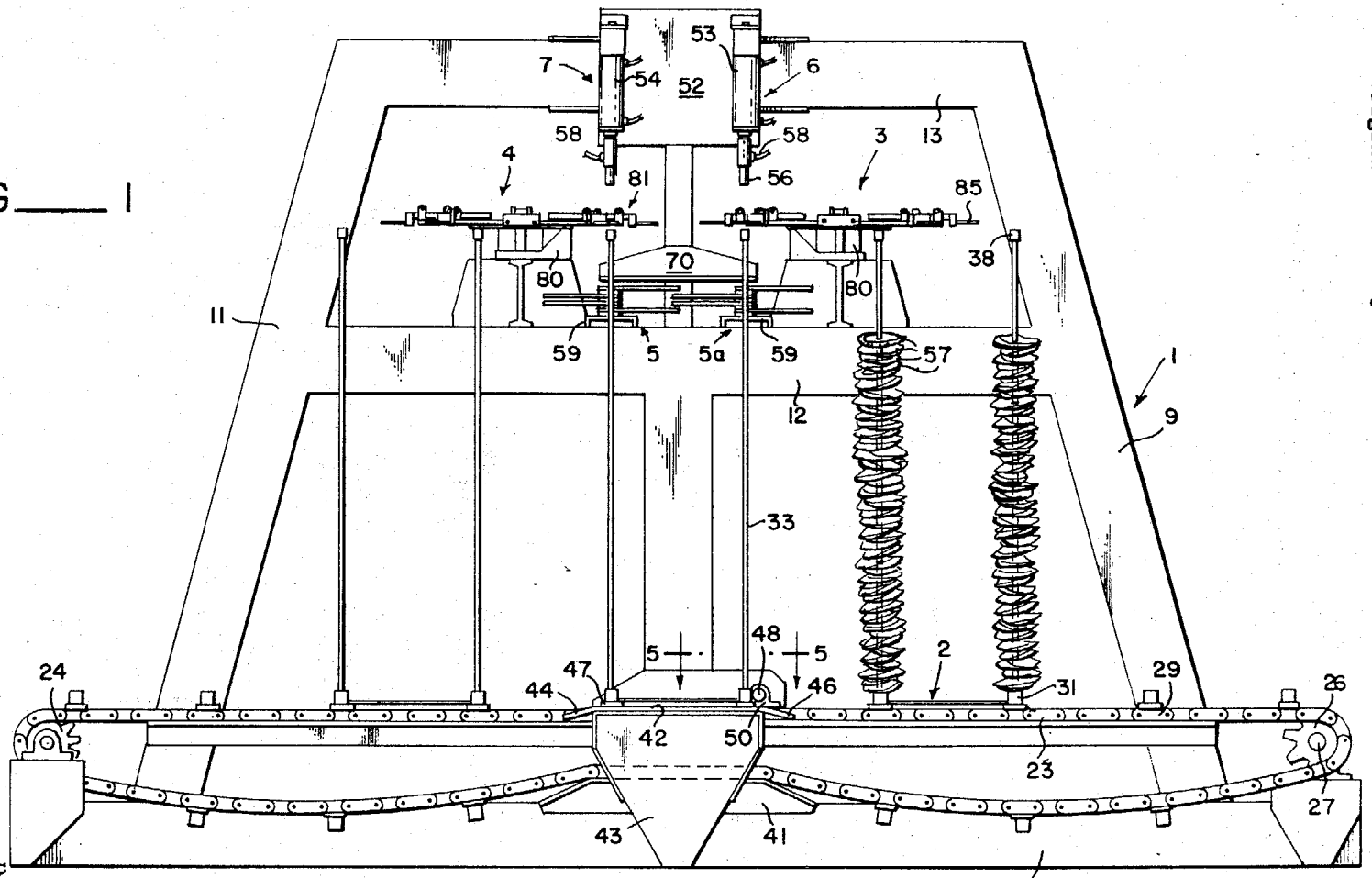
FIG. 1 is a rear elevational view of the apparatus.

Referring to FIG. 1, the punching and stringing apparatus comprises generally a main support frame 1, a string conveyor 2, indexing tables 3 and 4, clamping mechanisms 5 and 5a, and punch units 6 and 7 which cooperate with the indexing tables 3 and 4 respectively.

Referring now to the details of the apparatus, the main support frame 1 includes a generally rectangular base 8 and a vertical A-frame which includes the legs 9 and 11 and the cross members 12 and 13. On the front side of the vertical portion of the frame is a second vertical frame having a cross member 14, which is parallel to the member 12, and the legs 16 and 17 which are parallel to the legs 9 and 11. The front vertical frame is spaced forwardly from the A-frame by means of the beams 18 and 19. The parallel front and rear frames provide a means for supporting the various mechanisms presently to be described. In front of the rectangular frame, and supported by the base frame 8, is a platform 21 suitable for supporting a standing operator whose station is indicated generally at 22.

The string conveyor 2, mounted at the rear of the main support frame comprises a conventional endless link chain 23 which passes above an idler sprocket 24 mounted at one side of the base frame and a drive sprocket 26 located at the opposite end of the frame which is driven by the output shaft 27 of an air motor 28 carried on the base frame. The motor 28 may be a standard vane type air motor or the equivalent which runs constantly and moves the chain 23 when it is released and maintains a constant tension of the chain when the chain is halted as will presently be described. At evenly spaced increments along the length of the chain 23 special links 29 are inserted and provide a mounting means for the lugs 31 shown in detail in FIGS. 3 and 4. The lugs 31 may be cylindrical in shape and each has a center opening or bore 32 for the reception of a wire holding rod 33. In addition, adjacent pairs of lugs of the chain are provided with vertical slots 34 which face each other to enable a U-shaped wire string 36 to be received in the lug with its legs extending upwardly through the holes 37 in the rods 33. This relationship is shown most clearly in FIG. 3.

The upper ends of the rods 33 are provided with tips 38 which are pointed so as to cooperate with the punch units in a manner to be described. The lower ends of the rods 33 have a reduced diameter portion 39 which is received in the holes 32 of the lugs providing a shoulder which engages the top face of the lug and receives the force of the blow when the shells are punched. This feature prevents the bottom ends of the rods from being damaged after long use and insures that they are not distorted so as to prevent their insertion within the lugs. As viewed in FIG. 1, the rods are mounted on the chain at one side of the apparatus and are conveyed by the chain from left to right to the punch position and then to a position to be removed once the shells are strung. The rods are mounted on the conveyor by merely inserting the legs of a U-shaped wire string 36 into two rods and then inserting the lower ends of the rods into adjacent lugs on the chain as shown in FIG. 3. The wire string is thus held upright ready to receive the shells which are punched and dropped down on the rods. The rods are then removed leaving the shells on the wire string.

The chain 23 may be guided in its travel by any desirable means such as the guide plates 41 which contact and support a portion of the lower run of the chain. The upper run of the chain is supported by means of the parallel plates 42 mounted on an extended portion of the frame 43. Each of the plates 42 has inclined end portions 44 and 46 which contact transverse plates 47 mounted on the chain links in conjunction with the lugs 31. Thus, as the chain travels from left to right in FIG. 1, the inclined portions 44 serve to guide the lugs 31 onto the plates 42 so that the lugs, rods and wires are actually supported by the plates 42 at the center of the top run of the chain in the area in which the punching is accomplished.

As previously mentioned, the air motor 28 keeps a constant tension on the chain 23 so that the chain moves when released and must be held in the stationary or stop condition. To accomplish this, a conveyor stop pin 48 is slidably mounted in the block 50 carried on the lower portion of the A-frame adjacent the conveyor chain. The stop pin 48 moves in a direction transverse to the direction of the travel of the chain and, when in the extended position shown in FIG. 5, is located so as to contact the oncoming lug 31 of the chain to stop and hold the chain. The pin 48 is extended and withdrawn by an air cylinder 51. As will be explained in connection with the schematic shown in FIG. 8, the cylinder 51 normally holds the stop pin in the extended position by spring pressure and is pressure actuated to withdraw the pin. When a set of rods 33 moves toward the punch position, the conveyor chain is halted by the stop pin 48 and held in this position until a valve is operated to release the pin and to allow the chain to move.

As seen in FIG. 1, the pair of rods 33, when in the punch position, are vertically aligned with the punch units 6 and 7 respectively. The punch units 6 and 7 may be mounted on a plate or the like 52 carried by the frame member 13. The punch units 6 and 7 include the double acting cylinders 53 and 54 respectively. Except for their placement, the cylinders 53 and 54 may be identical and each will include a hollow punch member 56 fixed to its piston rod, with the opening in the hollow punch member being of a diameter slightly larger than the punch tip 38 on the rods 33 in order to allow the punch member to descend and pass over the tip thereby forming a hole in the shell. This action is shown in FIG. 3 which illustrates the shell 57 in dotted lines. The shell is carried downwardly by the force of the punch member 56 causing the tip 38 to pierce and punch a hole in the body of the shell. In order to insure removal of the punched portion of the shell from the top 56, a blow hose 58 may be fitted to each punch member 56 as illustrated in FIG. 1 to provide a constant stream of air to clean the punch.

Figure 7:
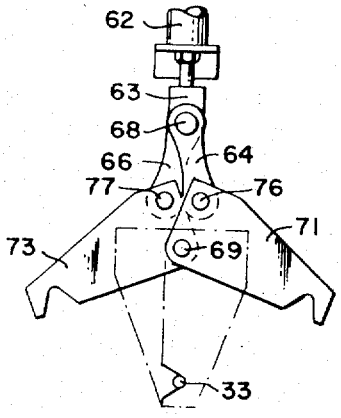
FIG. 7 is a plan view taken along lines 7—7 of FIG. 6.
Figure 6:
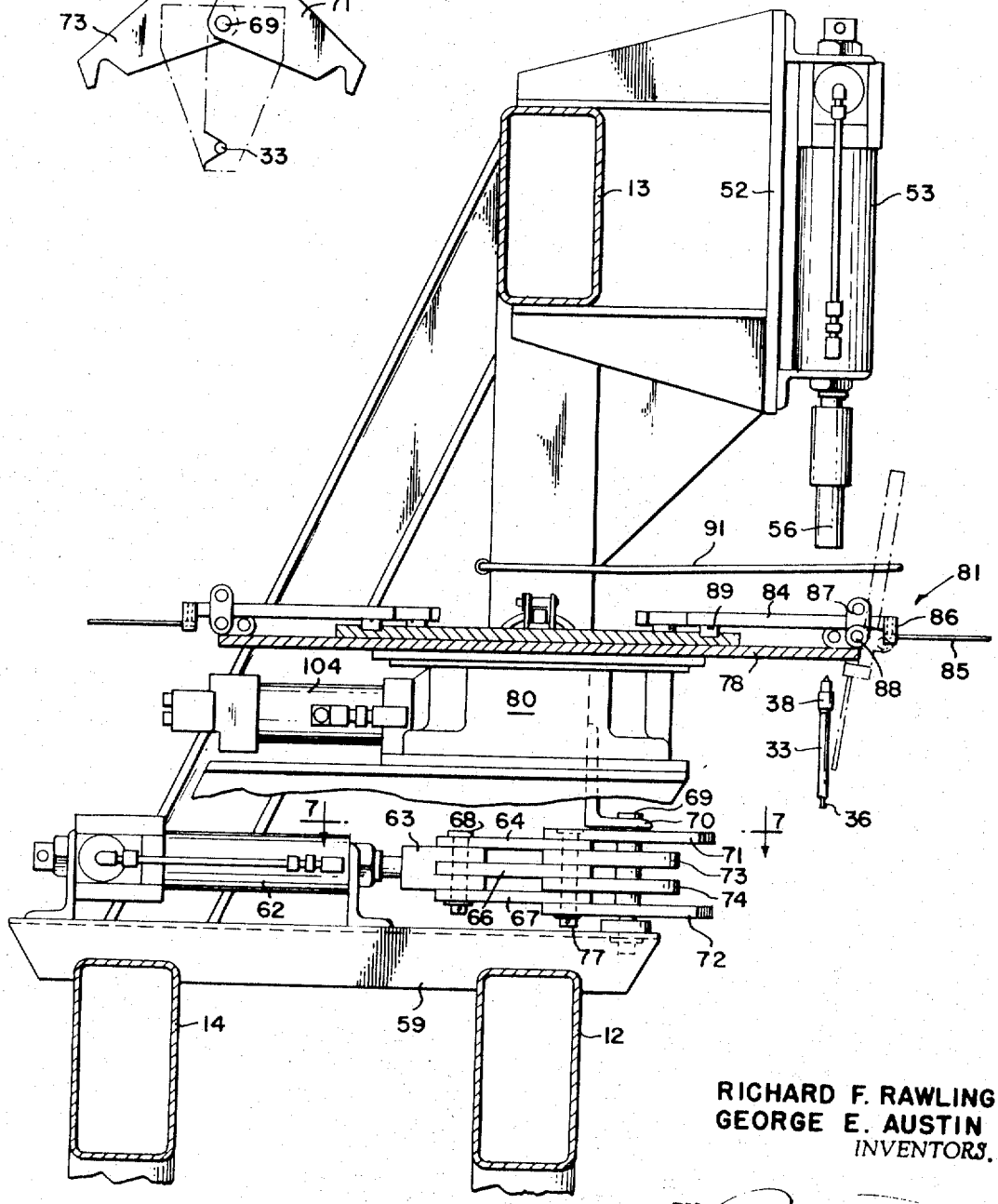
FIG. 6 is a partially sectioned end elevation of the apparatus.

Since the upper ends of the rods 33 are unsupported and must be aligned fairly precisely with the downwardly driven punches 56, clamping means indicated generally at 5 and 5a in FIG. 1 and shown in detail in FIGS. 6 and 7 are provided. Each clamping means includes a separate double acting clamp actuating cylinder and a set of clamping arms which are identical in structure, only one of which will be described in detail. Referring to FIGS. 1 and 6, a transverse channel iron or the like 59 extends between the beams 12 and 14 to support the two clamp actuating cylinders 61 and 62 respectively as well as the associated clamping jaws. As shown in FIG. 6, the piston rod of the clamp cylinder is connected to a clevis 63 which provides a common pivotal attachment for the three vertically spaced links 64, 66 and 67 on the pin 68. Mounted to the rear of the pin 68 is a single pivot pin 69 having its ends mounted in an angle bracket 70 and the channel member 59. Pivoted to the pins 69 are the upper and lower clamping arms 71 and 72 which form one side of the clamping device and the arms 73 and 74 spaced between the arms 71 and 72. Each of these arms is notched adjacent its outer end as shown in FIG. 7 for engaging the vertical rods 33 as shown in the dotted line position of the arms. In order to open and close the arms 71–74, the links 64 and 67 are pivoted by a single pin 76 to one side of the arms 71, 72 and the third link 66 is pivoted as at 77 to both the arms 73 and 74. With this arrangement, it will be seen that extension and retraction of the piston rods of the cylinders 61 and 62 causes the clamping arms of the individual clamping units to engage the upper end of the rods 33 as shown in FIG. 7 to hold the rod in a fixed position during the punching operation. The cycle of operation of the various cylinders and indexing tables will be explained presently in connection with the schematic shown in FIG. 8.

The indexing tables 3 and 4 may be identical in structure and include a rotatable table top 78 and a standard rotary indexing unit 79 with the indexing unit being driven by separate double acting air cylinders. The details of the indexing tables form no part of the present invention and many different designs are available commercially. At least one of the indexing units will include cam means for positioning a two-way open and close air valve for controlling the operation of the punches and clamping means for each index position of the tables. The rotary indexing tables, double acting cylinders and valves are therefore shown schematically in FIG. 8. Both tables upon being actuated by the air cylinder will rotate simulaneously through a predetermined angular distance and hold the shells in position while they are punched. The angle through which the indexing tables rotate is determined in each case by the number of shell holding assemblies 81 mounted on the table top 78. The table tops 78 may operate in the same or opposite directions and are fed with oyster shells from the operator's station 22. Also at the operator's station are the foot pedal controls 82 and 83 the purpose of which will be presently described in connection with FIG. 8.

Each shell holding assembly 81 comprises a weighted counter balance arms 84 which is provided with shell holding fingers 85 on its outer end. The fingers may be carried on cross bars 86 fixed to the arms 84. The fingers are preferably inserted into suitable holes in the bars and held by set screws or the like so as to be readily replaceable. The fingers and the arms are thus rigid and are pivoted to a short link 87 which, in turn, is pivotally connected as at 88 to the edge of the table top 78. As shown in FIG. 2, the shells 57 are deposited by hand onto the fingers 85 by the operator standing at station 22 who also controls the operation of the index table. In order to allow the shell holding members 81 to accommodate the downward motion of the punch, the arms 84 are held in horizontal position by means of the permanent magnet 89 until the descending punch contacts the shell held by the fingers and moves it downwardly on the rod 33. During this operation the fingers pivot downwardly and out of the way as shown in the dotted line portion of FIG. 6 to allow the indexing table to move the next increment. During its downward movement, the punch 56 moves the fingers 86 until the weighted arm 84 is passed the vertical as shown in FIG. 6 in which position it will remain until returned by the guide bar or bail 91 which serves to contact the arm 84 and return it to its horizontal position as the arm is rotated beyond the shell punching station. The magnet 89 holds the arm 84 in its horizontal position until the next punching operation.

Figure 8:
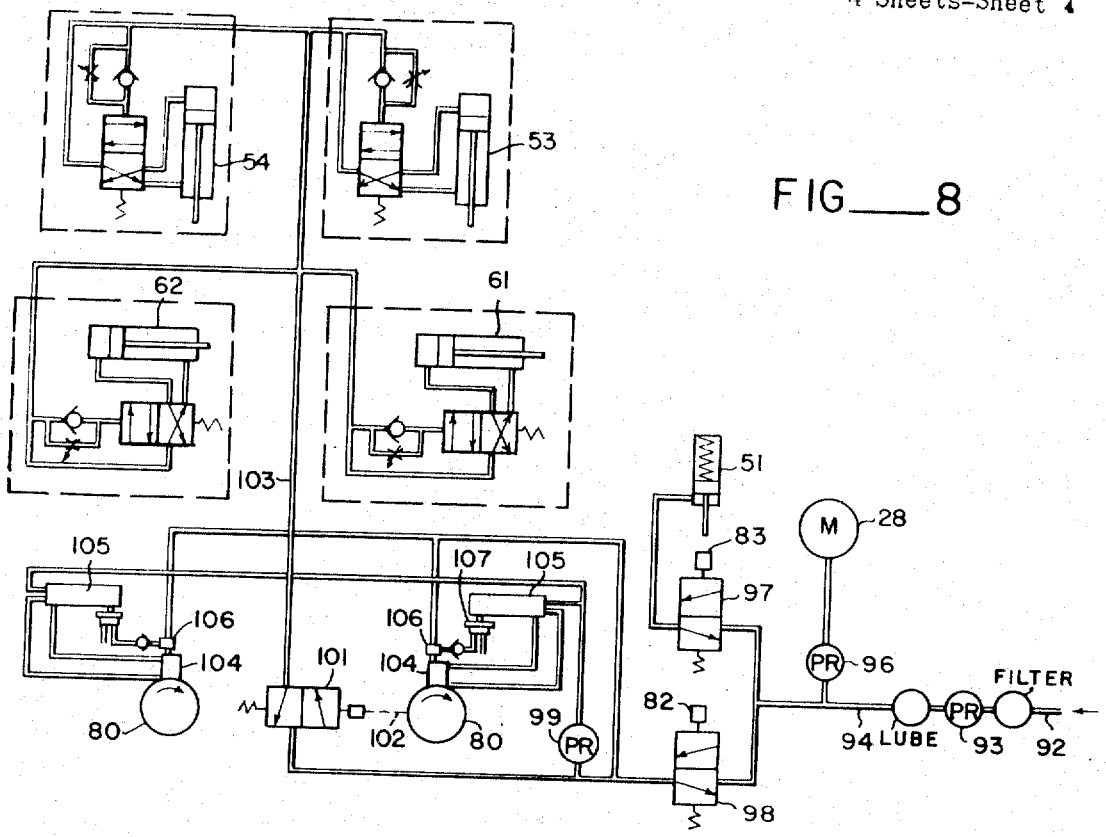
FIG. 8 is a schematic of the prenumatic system for the apparatus.

Referring now to FIG. 8, a source of pneumatic pressure such as a compressor or the like supplied the inlet conduit 92 which may include a pressure regulator 93 to control the line pressure. The conduit 94 is connected directly to the motor 28 as previously described and in station 22 serves to selectively connect the line pressure supplied to the motor. A spring returned 2-way valve 97 which is operated by the foot pedal 83 at the operator station 22 serves to selectively ionnect the line pressure to the conveyor stop cylinder 51 such that, as long as the foot pedal 83 is depressed, the stop pin 48 will be withdrawn to allow the conveyor to move. A second spring returned 2-way valve 98, operated by the foot pedal 82 controls the admission of pressure from the line 94 to the double acting air cylinders of the table indexing units 80 through the pressure regulator 99.

The operation of the clamp cylinders 61 and 62 and the punch cylinders 53 and 54 is controlled via the two-way valve 101 which is actuated by one of the indexing units 80, the valve being spring returned as illustrated in FIG. 8. The one indexing unit 80 also includes a mechanical actuator 102 such as an actuating pin, cam means or the like acting between the indexing unit and the valve, whereby the valve is shifted when the table is indexed to move a shell beneath the punch. Rotary indexing units equipped with valve or switch actuators are well known in the prior art and commercially available in many designs, the details of which form no part of the present invention.

When the valve 101 is in the position indicated in FIG. 8, the line 103 is open to atmosphere and when the valve is actuated by indexing assembly 80 and actuator 102, the line is subjected to pressure. The punches and the clamping mechanisms are, of course, operated simultaneously and, because of the position of the clamp cylinders 61 and 62 in the circuit as shown in FIG. 8, the clamp assemblies will actuate slightly ahead of the action of the punches. The double acting cylinders 53, 54, 61 and 62 are equipped with built in 4-way bleed pilot valves of known design whereby a single momentary pressure in the line 103 extends the piston rods their full stroke and immediately returns them to their original positions. Thus, with each indexing movement of the tables, the clamping means are actuated and returned and likewise the punches are actuated and returned.

In order to provide for continual cycling of the indexing assemblies 80 as long as pedal 82 is held depressed, these assemblies are provided with double acting air cylinders 104, 4-way pilot timer valves 105 and 2-way valves 106 actuated by movement of the air cylinders, as shown schematically in FIG. 8. With this arrangement, and with the foot pedal 82 held depressed, air pressure will be first admitted to actuate the cylinders 104 to index the tables with the 2-way valves 106 being shifted by movement of the pistons of the associated air cylinder. Shifting of the valves 106 controls the pilot mechanisms 107 which cause the valves 105 to shift position to return the piston rods of the cylinders 104. As the piston rods of the cylinders 104 return, the 2-way valves 106 are again shifted and the pilot mechanisms 107 will cause the valves 105 to reverse position again to actuate cylinders 104. The cycle repeats as long as the foot pedal 82 is depressed. Each time the indexing table is moved, of course, the clamping mechanisms and the punches are actuated and thus the machine will continue to string shells as long as the foot pedal 82 is depressed and shells are deposited on the fingers 85 by the operator.

To operate the apparatus, an attendant keeps the conveyor belt 23 supplied with wire strings by mounting the U-shaped wire 36 in the rods 33 and placing them in the paired lugs as illustrated in FIG. 1. When the operator at station 22 desires to start a new string, the foot pedal 83 is operated to withdraw the stop pin 48 and allow the conveyor to advance a wire. As the wire string approaches the punch position, the foot pedal 83 is released to stop the conveyor thus positioning the rod 33. The punching and stringing is accomplished by continually loading the support fingers 85 with oyster shells and depressing the foot pedal 82. Each time the foot pedal 82 is depressed and released, the tables 3 and 4 will index one position to position a shell over both of the rods 33 ready for punching. As soon as the indexing table actuates the control valve 101, the clamping cylinders 61 and 62 are actuated to hold the rods 33 in alignment and almost simultaneously, the punch cylinders 53 and 54 are actuated. As the punches descend, the shell is pushed down over the tip 38 of the rod 33 and allowed to fall. As this happens, the supporting fingers 85 are pivoted downwardly by the motion of the punch and, upon further indexing of the tables, these fingers are returned to their horizontal attitude as previously explained. The machine may, of course, be caused to continually cycle as previously explained. As soon as the operator has filled a string, the foot pedal 83 is again depressed allowing the completed string to move to the right as viewed in FIG. 1 to align the succeeding set of rods and wire string. The strung shells which are now on the rods 33 as illustrated are then lifted from the conveyor and the rods are merely slipped off of the wire leaving the shells strung loosely on the U-shaped wire. The end of the wire may then be crimped or bent so as to prevent removal of the shells and the string is complete.

From the foregoing, it will be apparent to those skilled in the art that the present invention provides new and useful improvements in shell punching and stringing apparatus of the character described. The arrangement and types of structural components utilized within this invention may be subjected to numerous modifications well within the purview of this invention and applicants intend only to be limited to a liberal interpretation of the specification and appended claims.

Having thus described the invention, what is claimed as new and desired to be secured by Letters Patent is:

1. A shell stringing device for stringing shells on a wire-like stringer comprising in combination: means to mount said stringer in shell receiving position, stiffener rod means, means to support said rod means in association with said stringer, punch means for impacting a shell located over the end of said rod to force the shell over the rod and the stringer, said means to support said rod means being adapted to absorb the impact of said punch means transmitted through the rod releasable rod positioning means for engaging the rod to hold the rod in alignment with the punch means during operation thereof, and means for yieldably supporting shells in punching position over the end of said rod.

2. The combination according to claim 1 wherein: said stiffener rod means comprises a hollow rod adapted to telescope over said stringer.

3. The combination according to claim 2 wherein, said rod means includes a punch tip and said punch means includes a hollow punch element adapted to telescope over said punch tip, whereby a hole is punched in each shell as the shell is forced over the rod.

[4. The combination according to claim 3 wherein: said indexing means includes a rotary index table, said table having shell supporting assemblies spaced about the periphery thereof and disposed to be sequentially positioned above the rod as the table is indexed, said shell supporting assemblies being adapted to support a single shell, and mounting means connecting said assemblies to said table, said mounting means serving to move the assembly away from said punch means and the rod means as the shell is carried downwardly over the rod.]

5. The combination according to claim [4] *1* including: conveyor means, means to removably mount a plurality of said stringers and said rod means on the conveyor, and fixed support means beneath said conveyor and vertically aligned with the punch means providing support for the conveyor and rod means during the punching operation.

6. The device according to claim 1 wherein: said stringer is U-shaped, said rod means comprising first and second rod members telescoped over the respective ends of the legs of the stringer, said punch means including first and second punch mechanisms for simultaneously impacting shells located over the ends of said rod members, [said indexing means including first and second index mechanisms for simultaneous support and sequential movement of shells into punching position over the ends of said rods.]

7. The combination according to claim 6 wherein: said rod positioning means includes first and second rod positioning means for simultaneously engaging the said rods to hold the rods in positive alignment with the associated punch mechanism during operation thereof.

[8. The combination according to claim 7 wherein: each of said index mechanisms comprises a rotary index table, said table having shell supporting assemblies spaced about the periphery thereof and disposed to be sequentially positioned above the associated rod as the table is indexed, said shell supporting assemblies being adapted to support a single shell, and mounting means connecting said assemblies to said table, said mounting means serving to move the assembly away from the associated punch mechanism and rod as the shell is carried downwardly over the rod.]

[9. The combination according to claim 8 including: conveyor means, means to removably mount a plurality of said stringers and associated rod members on the conveyor, and fixed support means beneath said conveyor and vertically aligned with the punch means providing support for the conveyor and rod members during the punching operation.]

[10. The combination according to claim 9 including: a control system for selectively controlling the operation of the device, said control system including first control means for actuating said index tables and second control means responsive to the indexing of said table for actuating said clamp means and said punch means simultaneously.]

References Cited

The following references, cited by the Examiner, are of record in the patented file of this patent or the original patent.

UNITED STATES PATENTS

| | | | |
|---|---|---|---|
| 2,004,464 | 6/1935 | Clarkson | 29—208 F |
| 2,403,443 | 7/1946 | Knab | 83—95 X |
| 2,437,994 | 3/1948 | Beyer | 83—411 X |

FOREIGN PATENTS

| | | | |
|---|---|---|---|
| 739,708 | 11/1932 | France | 83—95 |
| 753,245 | 8/1933 | France | 83—95 |

FRANK T. YOST, Primary Examiner

U.S. Cl. X.R.

29—241, 433; 83—267, 925 R